G. L. MILLER.
ROLLER BEARING.
APPLICATION FILED APR. 11, 1919.

1,360,430.

Patented Nov. 30, 1920.

INVENTOR
George L. Miller,
By F. W. Bond.
ATTORNEY.

UNITED STATES PATENT OFFICE.

GEORGE LEE MILLER, OF CANTON, OHIO, ASSIGNOR TO THE GILLIAM MANUFACTURING COMPANY, OF CANTON, OHIO, A CORPORATION OF OHIO.

ROLLER-BEARING.

1,360,430.     Specification of Letters Patent.     Patented Nov. 30, 1920.

Application filed April 11, 1919. Serial No. 289,183.

*To all whom it may concern:*

Be it known that I, GEORGE LEE MILLER, a citizen of the United States, residing at Canton, in the county of Stark and State of Ohio, have invented a new and useful Roller-Bearing, of which the following is a specification.

This invention relates to roller bearings, and is an improvement over the structure disclosed in my Patent Number 1,282,450, dated Oct. 22, 1918, the object being to construct a bearing with a three point contact at the larger end of each roller.

Another object is to construct each roller so that it will maintain a perfect alinement should either end of the roller be under size.

Another object is to construct each roller with a three point bearing at the larger end, the center bearing point receiving the thrust while the adjacent bearing points serve to keep the roller in alinement.

Another object is to construct a roller bearing, the cage having openings for the rollers, the faces of which openings are substantially parallel to the faces of the rollers contacting therewith.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the accompanying drawing.

Similar numerals of reference indicate corresponding parts throughout the several figures of the drawing.

At 1 I have shown a cone upon which is designed to operate the rollers 2. The cup is shown at 3 and the cage at 4. A snap ring 5 secures the several parts of the bearing together as disclosed in my co-pending application above referred to.

Figure 1:
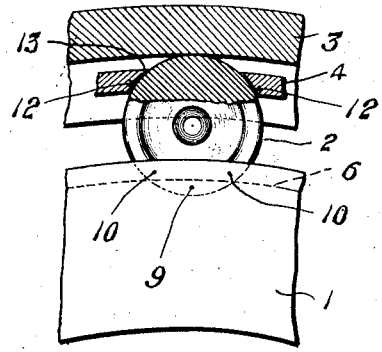
Figure 1 is a fragmentary elevation partly in section, showing one roller of my roller bearing in position between the cone and cup and with a portion of the cage shown in section thereon.
Figure 2:
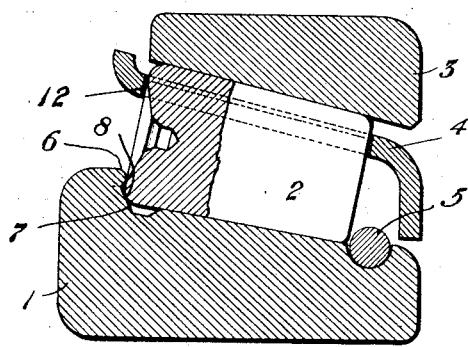
Fig. 2 is a vertical longitudinal section through one side of the bearing with part of the roller shown in elevation.
Figure 4:
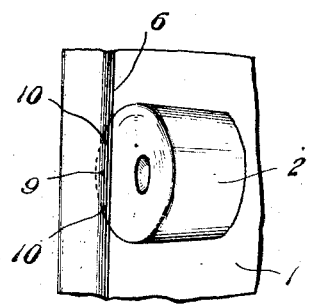
Fig. 4 is a fragmentary plan view of the larger end of the roller with the cage removed therefrom.

It sometimes occurs in manufacturing roller bearings that, in spite of the extreme care and inspection given the rollers after they are finished, a slightly imperfect roller will inadvertently pass the inspection and find its way into the roller bearing assembly. Since a roller slightly over size would be detected in the assembling it is improbable that the over size roller will pass through to the finished product, but a roller a half of a thousandth of an inch under size at either end may get into an assembly undetected. The bearing faces of the cup and cone being ground with the maximum accuracy known to mechanical skill, should a roller under size at either end be assembled in a bearing, the result would be that the other end of the said roller being in contact with the cup and cone bearing surfaces would act substantially as a pivot for the said roller, allowing the smaller end to swing transversely of its axis of rotation. This movement of course will be very slight but due to the fact that the cage at the point where the twisted end of the roller contacts will be gradually worn away the lateral movement of the roller will increase until it has reached the point at which further movement is stopped by contact with the cup. It is obvious that this result as just described of assembling a roller under size at either end in a completed bearing is extremely undesirable. To overcome the possibility of the roller swinging out of line as described should either end of it be slightly under size, I form at the larger end of the cone and upon the inner side of the thrust flange a rounded bead or secondary flange 6. This flange is formed at the outer extremity of the thrust surface 7 upon which surface the thrust point 8 of each roller is designed to bear there being a point contact between the surfaces 7 and 8 as indicated at 9 in Figs. 1 and 4. The bead or flange 6 is so positioned that when the bearing point 8 is in contact with the thrust surface 7 two points indicated at 10 upon the larger end of the roller will be in contact with the said bead. It is to be understood that while there is a three point contact at the larger end of each roller, as just described, the point 9 only receives the thrust of the roller, the other two points being the lightest kind of a contact and not receiving any of the thrust of the roller. By reason of the fact that the contact points 10 are spaced at either side of the thrust point 9, which point 9 is on the exact vertical center of the end of each roller, any tendency of the roller to swing out of axial alinement because of being under size at either end will be immediately checked by one or the other of the contact points 10. It will thus be seen that even though either end of the roller were slightly under size, the roller would be forced to maintain perfect alinement at all times.

Figure 3:
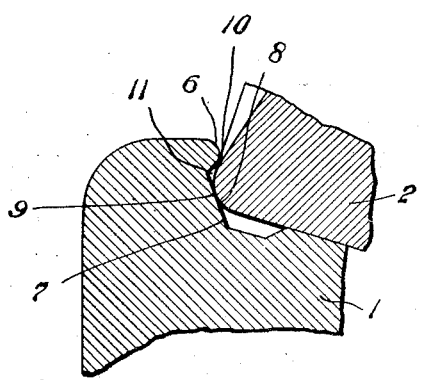
Fig. 3 is an enlarged detail showing the point of contact of the thrust bearing at the larger end of the roller.

Reference to the enlarged detail shown in Fig. 3 will disclose a space or pocket indicated at 11 and lying between the contact point 9 and the points 10, the object of this pocket being to retain lubricant which will work downwardly from the lubricant distributing surface at the larger end of the roller and thus insure the constant lubrication for the three point contact.

In order to further insure a perfect and constant alinement of the rollers I have made the faces 12 of the openings 13 in the cage through which the rollers project, substantially parallel to the surface of the roller at the points adjacent the said faces. These faces 12 while substantially parallel to the surface of the roller adjacent the said faces will preferably be flat instead of conforming to the exact curve of the roller, a line contact therefore being made between the roller and the faces 12.

From the foregoing description it will be obvious that a bearing constructed in accordance with my invention will eliminate the possibility of trouble arising through the inadvertent use of a roller under sized at either end.

Having fully described my invention what I claim as new and desire to secure by Letters Patent, is:

1. In a roller bearing of the character described, a cone, a plurality of rollers arranged to operate upon said cone, and a thrust flange, provided with a bead, formed upon said cone, one end of each roller being arranged to contact with said flange at one point and with said bead at two points.

2. In a roller bearing of the character described, a cone, a plurality of rollers arranged to operate upon said cone, a rounded end upon each of said rollers, and a thrust flange provided with a bead formed upon said cone, the rounded end of each roller being designed to contact with said thrust flange at one point and with said bead at two points.

3. In a roller bearing of the character described, a cone, a thrust flange formed upon said cone, an inwardly extending bead at the outer extremity of said flange, a plurality of rollers arranged to rotate upon said cone, a rounded edge formed upon each roller at its larger end, said rounded edge being designed to contact with said thrust flange at one point and with said bead at two oppositely disposed adjacent points.

4. In a roller bearing of the character described, a cone, a flange provided with a bead formed upon said cone, and a plurality of rollers arranged to operate upon said cone and in contact with said flange and bead at three points, said contact maintaining perfect axial alinement of said rollers.

5. In a roller bearing of the character described, a cone, a plurality of rollers upon said cone, a flange formed upon said cone and provided with a bead, said flange and bead having a three point contact at one end of each of said rollers.

6. In a roller bearing of the character described, a cone, a plurality of rollers upon said cone, a flange formed integral with said cone and a bead upon said flange, each of said rollers being arranged to contact at two points with said bead and at one point intermediate said two points and equi-distant therefrom with said flange.

7. In a roller bearing of the character described, a cone and a plurality of rollers upon said cone, a flange formed integral with said cone and designed to contact with each roller at one point, a bead upon said flange designed to contact with the said roller at two points equi-distantly spaced from said first point.

8. In a roller bearing of the character described, a cone, a plurality of rollers upon said cone, a flange upon said cone and a bead upon said flange, said bead being designed to contact at two points with the end of each of said rollers, said flange being designed to contact with said rollers at one point equi-distant from each of said first points and a space intermediate each of said rollers and the adjacent faces of said flange and bead, said space being designed to hold and distribute lubricant to said three points.

In testimony that I claim the above, I have hereunto subscribed my name.

GEORGE LEE MILLER.